US012342303B2

(12) United States Patent
Li

(10) Patent No.: US 12,342,303 B2
(45) Date of Patent: Jun. 24, 2025

(54) COMMUNICATION METHOD FOR NON-TERRESTRIAL NETWORK AND TERMINAL DEVICE

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 400 days.

(21) Appl. No.: 17/888,860

(22) Filed: Aug. 16, 2022

(65) Prior Publication Data

US 2023/0007608 A1 Jan. 5, 2023

Related U.S. Application Data

(63) Continuation of application No. PCT/CN2020/075742, filed on Feb. 18, 2020.

(51) Int. Cl.
*H04W 56/00* (2009.01)
*H04W 74/0808* (2024.01)

(52) U.S. Cl.
CPC ... *H04W 56/0045* (2013.01); *H04W 74/0808* (2013.01)

(58) Field of Classification Search
CPC .............. H04W 56/0045; H04W 74/0808
See application file for complete search history.

(56) References Cited

U.S. PATENT DOCUMENTS

| 2016/0302129 | A1* | 10/2016 | L?hr | H04W 36/04 |
| 2018/0139747 | A1* | 5/2018 | Hosseini | H04W 72/0446 |
| 2019/0090262 | A1 | 3/2019 | Yan et al. | |
| 2020/0053752 | A1 | 2/2020 | Huang et al. | |
| 2021/0321464 | A1* | 10/2021 | Lin | H04B 7/1851 |
| 2022/0191898 | A1* | 6/2022 | Sergeev | H04W 72/20 |
| 2022/0330261 | A1* | 10/2022 | Yeo | H04L 5/0053 |

FOREIGN PATENT DOCUMENTS

| CN | 102045840 A | 5/2011 |
| CN | 109089309 A | 12/2018 |
| CN | 109842932 A | 6/2019 |
| CN | 109923911 A | 6/2019 |
| CN | 110446254 A | 11/2019 |
| CN | 110650527 A | 1/2020 |

(Continued)

OTHER PUBLICATIONS

The first Office Action of corresponding European application No. 20920682.0, dated Jul. 16, 2024.

(Continued)

*Primary Examiner* — Jackie Zuniga Abad
(74) *Attorney, Agent, or Firm* — Ladas & Parry LLP

(57) ABSTRACT

Provided in embodiments of the disclosure are a communication method and device. A terminal device receives configuration information from a network device, and transmits timing advance (TA) information to the network device according to the configuration information. The TA information is configured to indicate a TA value determined by the terminal device.

12 Claims, 8 Drawing Sheets

(56) References Cited

FOREIGN PATENT DOCUMENTS

WO  2019139407 A1  7/2019
WO  2020031120 A2  2/2020

OTHER PUBLICATIONS

International Search Report (ISR) dated Nov. 10, 2020 for Application No. PCT/CN2020/075742.
Written Opinion (WOSA) dated Nov. 10, 2020 for Application No. PCT/CN2020/075742.
The EESR of corresponding European application No. 20920682.0, dated Oct. 13, 2023.
The first Office Action of corresponding Chinese application No. 202080081572.0, dated Dec. 5, 2023.

* cited by examiner

COMMUNICATION METHOD FOR NON-TERRESTRIAL NETWORK AND TERMINAL DEVICE

CROSS-REFERENCE TO RELATED APPLICATIONS

The present disclosure is a continuation of International Application No. PCT/CN2020/075742, filed on Feb. 18, 2020, entitled "COMMUNICATION METHOD AND DEVICE, AND APPARATUS", the content of which is incorporated herein by reference in its entirety.

TECHNICAL FIELD

The present disclosure relates to the field of communication technologies, and particularly to a communication method and device.

BACKGROUND

A non-terrestrial network (NTN) refers to a communication network between a terminal device and a satellite (also referred to as a network device).

In uplink transmission, the network device requires that uplink signals transmitted from different terminal devices at a same time, arrive at the network device substantially at a unified time, that is, the arrival times of these uplink signals are substantially aligned. For example, for a terminal device that is far away from the network device, due to a large transmission delay, such terminal device has to transmit its uplink data earlier than a terminal device that is close to the network device. Therefore, the network device determines a timing advance (TA) value of each terminal device by measuring the uplink transmission of the terminal device, and transmits the TA value to the terminal device, such that the terminal device adjusts the transmission time of its uplink data according to the TA value, so as to control the arrival times at which the uplink signals transmitted from different terminal devices arrive at the network device to be aligned.

However, in the NTN system, for a non-GEO scenario, the TA value between the terminal device and the network device changes rapidly and greatly. Through the above method, the network device may not be able to control the TA value of the terminal device to be updated in real time. As a result, the TA value of the terminal device is not updated in time, resulting in frequent uplink out-of-synchronization.

SUMMARY

Embodiments of the present disclosure provide a communication method, apparatus, and device, so as to avoid frequent uplink out-of-synchronization.

In a first aspect, an embodiment of the present disclosure provides a communication method, including:
receiving, by a terminal device, configuration information from a network device; and
transmitting, by the terminal device, timing advance TA information to the network device, according to the configuration information, where the TA information is configured to indicate a TA value determined by the terminal device.

In a second aspect, an embodiment of the present disclosure provides a communication method, including:

transmitting, by a network device, configuration information to a terminal device; and
receiving, by the network device, timing advance TA information from the terminal device, where the TA information is configured to indicate a TA value determined by the terminal device.

In a third aspect, an embodiment of the present disclosure provides a communication apparatus, including:
a receiving module, configured to receive configuration information from a network device; and
a transmitting module, configured to transmit timing advance TA information to the network device according to the configuration information, where the TA information is configured to indicate a TA value determined by the terminal device.

In a fourth aspect, an embodiment of the present disclosure provides a communication apparatus, including:
a transmitting module, configured to transmit configuration information to a terminal device; and
a receiving module, configured to receive timing advance TA information from the terminal device, where the TA information is configured to indicate a TA value determined by the terminal device.

In a fifth aspect, an embodiment of the present disclosure provides a terminal device, including a transceiver, a processor, and a memory,
the memory is configured to store computer-executable instructions; and
the processor is configured to execute the computer-executable instructions stored in the memory, to cause the processor to perform the communication method according to the first aspect.

In a sixth aspect, an embodiment of the present disclosure provides a network device, including a transceiver, a processor, and a memory,
the memory is configured to store computer-executable instructions; and
the processor is configured to execute the computer-executable instructions stored in the memory, to cause the processor to perform the communication method according to the second aspect.

In a seventh aspect, an embodiment of the present disclosure provides a computer-readable storage medium, where computer-executable instructions are stored in the computer-readable storage medium. The computer-executable instructions, when being executed by a processor, cause the communication method according to the first aspect to be implemented.

In an eighth aspect, an embodiment of the present disclosure provides a computer-readable storage medium, where computer-executable instructions are stored in the computer-readable storage medium. The computer-executable instructions, when being executed by a processor, cause the communication method according to the second aspect to be implemented.

DESCRIPTION OF EMBODIMENTS

Figure 1:
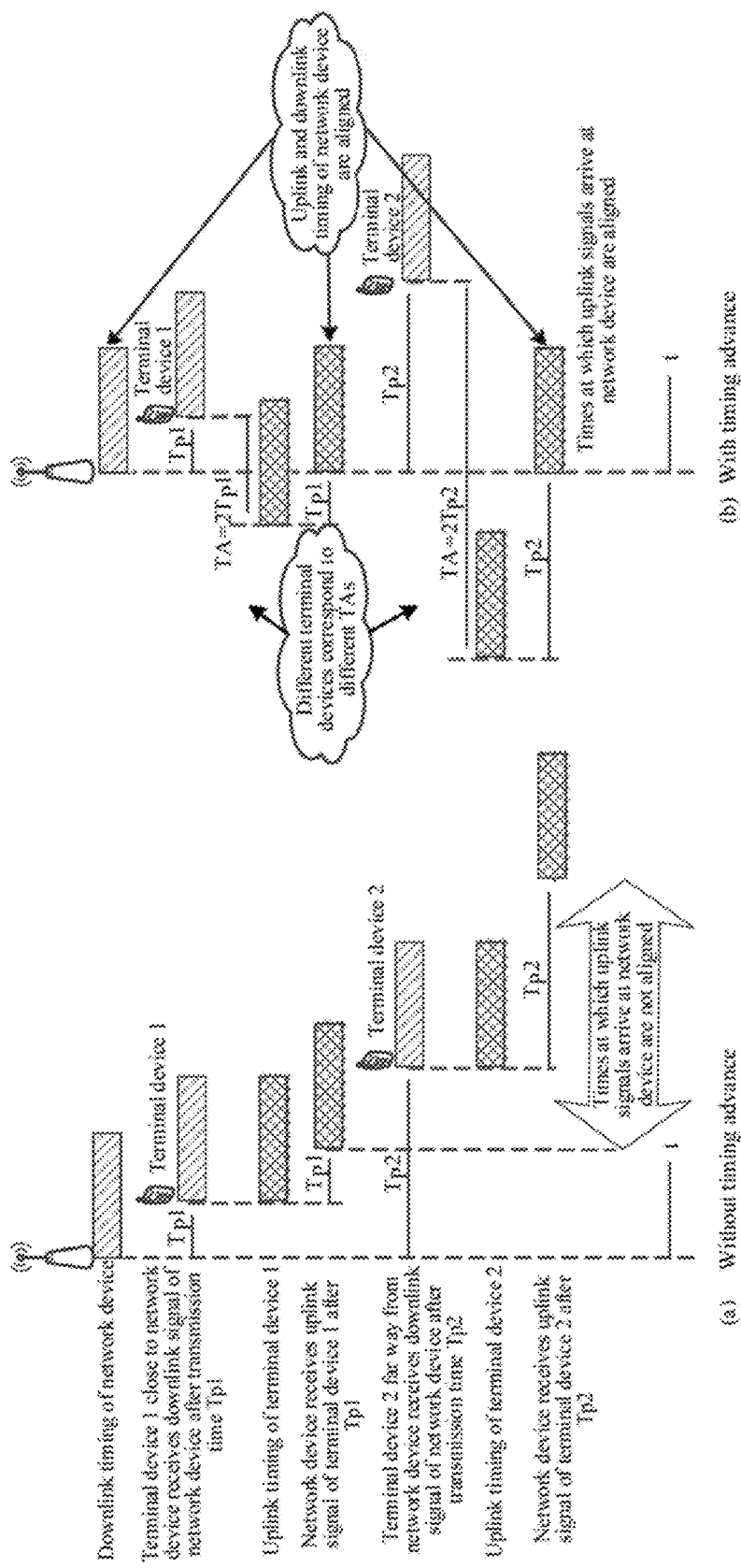
FIG. 1 is a schematic diagram illustrating timing advance provided by an embodiment of the present disclosure.

For ease of understanding, the concepts involved in the present disclosure will be explained first.

Terminal device: it is usually capable of performing wireless transmitting and receiving. The terminal device may be deployed on the ground, including indoor or outdoor, handheld, wearable or in-vehicle terminal devices; it may also be deployed on water (such as on ships, etc.); it may also be deployed in the air (for example, on the aircraft, balloon and satellite, etc.). The terminal device may be a mobile phone, a tablet computer (Pad), a computer capable of performing wireless transmitting and receiving, a virtual reality (VR) terminal device, an augmented reality (AR) terminal device, a wireless terminal in industrial control, an in-vehicle terminal device, a wireless terminal in self-driving, a wireless terminal device in remote medical, a wireless terminal device in smart grid, a wireless terminal device in transportation safety, a wireless terminal device in smart city, a wireless terminal device in smart home, a wearable terminal device, etc. The terminal device involved in the embodiments of the present disclosure may also be referred to as a terminal, user equipment (UE), access terminal device, in-vehicle terminal, industrial control terminal, UE unit, UE station, mobile station, mobile unit, remote station, remote terminal device, mobile device, UE terminal device, wireless communication device, UE proxy or UE device, etc. The terminal device may also be stationary or mobile.

Network device: it is usually capable of performing wireless transmitting and receiving. The network device may have mobile characteristics, for example, the network device may be a mobile device. In some implementations, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. For example, an orbital altitude of the LEO satellite usually ranges from 500 km to 1500 km, and an orbital period (a period of rotating around the earth) thereof is about 1.5 hours to 2 hours. The signal propagation delay of single-hop communication between users is about 20 ms. The single-hop communication delay between users refers to a delay of transmission from the terminal device to the network device, or a delay of transmission from the network device to a transmission device. A maximum visibility time of the satellite is about 20 minutes. The maximum visibility time refers to a maximum duration during which the beam of the satellite covers a certain area of the ground. The LEO satellite moves relative to the ground. As the satellite moves, the ground area covered by the satellite changes. The LEO satellite has a short signal propagation distance, a low link loss, and little requirements for the transmit power of the terminal device. The orbital altitude of the GEO satellite is usually 35786 km, and the orbital period thereof is 24 hours. The signal propagation delay of single-hop communication between users is about 250 ms. In order to ensure the coverage of the satellite and improve the system capacity of the communication network, the satellite may use multiple beams to cover the ground. For example, one satellite may provide tens or hundreds of beams to cover the ground, and one beam may cover a ground area having a diameter of tens to hundreds of kilometers. Of course, the network device may also be a base station deployed on the ground, water, etc. For example, the network device may be a next generation NodeB (gNB) or a next generation-evolved NodeB (ng-eNB). Among them, the gNB provides user plane functions and control plane functions of the new radio (NR) interface for the UE, and the ng-eNB provides user plane functions and control plane functions of the evolved universal terrestrial radio access (E-UTRA) for the UE. It should be noted that the gNB and the ng-eNB are only a name, which is used to indicate a base station supporting a 5G network system, and are not limiting. The network device may also be a base transceiver station (BTS) in a GSM system or a CDMA system, a nodeB (NB) in a WCDMA system, or an evolutional node B (eNB or eNodeB) in an LTE system. Alternatively, the network device may also be a relay station, an access point, an in-vehicle device, a wearable device, and a network-side device in a network after 5G or a network device in a future evolved PLMN network, a roadside site unit (RSU), etc.

Uplink synchronization: it means that uplink signals, transmitted with a same time slot resource by terminal devices in different positions in a same cell, arrive at the network device at the same time. That is, the signals from different terminal devices in the same time slot arrive at the network device synchronously. Its purpose is to reduce uplink multiple access interference and multipath interference between different terminal devices in a cell, and increase the cell capacity and cell radius.

Timing advance (TA): An important characteristic of uplink transmission is that different terminal devices perform orthogonal multiple access in time and frequency domains, that is, uplink transmissions of different terminal devices in a same cell do not interfere with each other. In order to ensure the orthogonality of the uplink transmissions and avoid intra-cell interference, the network device requires that the arrival times, at which signals transmitted from different terminal devices at a same time but with different frequency domain resources arrive at the network device, are substantially aligned. In order to ensure the time synchronization on the network device side, the communication system (such as the NR system) supports the mechanism of uplink timing advance.

The uplink clock and downlink clock on the network device side are the same, but there is an offset between the uplink clock and the downlink clock on the terminal device side, and different terminal devices have their own different uplink timing advance (which may be referred to as TA amount, or TA value). By appropriately controlling the offset of each terminal device, the network device may control the arrival time at which the uplink signals from different terminal devices arrive at the network device. For a terminal device far away from the network device, due to a large transmission delay, such terminal device has to transmit its uplink data earlier than a terminal device close to the network device.

Next, the timing advance is introduced with reference to FIG. 1. FIG. 1 is a schematic diagram illustrating timing advance provided by an embodiment of the present disclosure. In which, (a) in FIG. 1 illustrates a case without timing advance, and (b) in FIG. 1 illustrates a case with timing advance.

As shown in (a) of FIG. 1, after the network device transmits a downlink signal at time 0, the downlink signal is received by a terminal device 1 that is close to the network device after a transmission time Tp1, that is, the terminal device 1 receives the downlink signal at time Tp1. The terminal device 1 uses this time as uplink timing, and transmits an uplink signal to the network device. The uplink signal transmitted by the terminal device 1 arrives at the network device after the transmission time Tp1, that is, the uplink signal transmitted by the terminal device 1 arrives at the network device at time 2Tp1. Similarly, the downlink signal transmitted by the network device at time 0 is received by a terminal device 2 that is far away from the network device after a transmission time Tp2, that is, the terminal device 2 receives the downlink signal at time Tp2. The terminal device 2 uses this time as the uplink timing, and transmits an uplink signal to the network device. The uplink signal transmitted by the terminal device 2 arrives at the network device after the transmission time Tp2, that is, the uplink signal transmitted by the terminal device 2 arrives at the network device at time 2Tp2. As can be seen, the arrival times, at which the uplink signal transmitted by the terminal device 1 and the uplink signal transmitted by the terminal device 2 arrive at the network device, are not aligned.

As shown in (b) of FIG. 1, after the network device transmits a downlink signal at time 0, the downlink signal is received by the terminal device 1 that is close to the network device after a transmission time Tp1, that is, the terminal device 1 receives the downlink signal at time Tp1. The terminal device 1 makes the uplink timing advanced (the advanced time is 2Tp1), and transmits an uplink signal to the network device. The uplink signal transmitted by the terminal device 1 arrives at the network device after the transmission time Tp1, that is, the uplink signal transmitted by the terminal device 1 arrives at the network device at time 0. Similarly, the downlink signal transmitted by the network device at time 0 is received by the terminal device 2 that is far away from the network device after a transmission time Tp2, that is, the terminal device 2 receives the downlink signal at time Tp2. The terminal device 2 makes the uplink timing advanced (the advanced time is 2Tp2), and transmits an uplink signal to the network device. The uplink signal transmitted by the terminal device 2 arrives at the network device after the transmission time Tp2, that is, the uplink signal transmitted by the terminal device 2 arrives at the network device at time 0. As can be seen, the arrival times, at which the uplink signal transmitted by the terminal device 1 and the uplink signal transmitted by the terminal device 2 arrive at the network device, are aligned.

In (a) of FIG. 1, the effect of not performing uplink timing advance is shown. As can be seen from (b) of FIG. 1, the timing of the uplink sub-frame and the timing of the downlink sub-frame on the network device side are the same, but there is an offset between the timing of the uplink sub-frame and the timing of the downlink sub-frame of the terminal device, that is; there is uplink timing advance TA.

In the related art (for example, in the NR system), the TA value of the terminal device is controlled by the network device. The network device determines the TA value of each terminal device by measuring the uplink transmission of the terminal device. As long as the terminal device performs uplink transmission, the network device may utilize it to measure the TA value. After the network device determines the TA value for the terminal device, it transmits the TA value to the terminal device through a timing advance command (TA command).

The network device transmits the TA command to the terminal device in the following two forms.

(1) Initial TA: During the random access process, the network device determines the TA value by measuring the random access preamble transmitted by the terminal device, and transmits it to the terminal device through a TA command field in a random access response (RAR).

(2) Adjustment of TA in RRC connected state: Although uplink synchronization is achieved between the terminal device and the network device during the random access process, the timing of the uplink signal arriving at the network device may vary over time. For example, there are several situations as follows: (a) the transmission delay between a network device and a terminal device in high-speed movement would change constantly; (b) a current transmission path disappears and it is switched to a new transmission path, for example, this situation is likely to occur when the terminal device moves to the corner of a building in a densely built city; (c) a crystal oscillator of the terminal device is offset, and the accumulation of offset for a long time may cause an error in the uplink timing; and (d) a Doppler frequency shift and the like is caused due to the movement of the terminal device. Therefore, the terminal device needs to continuously update its uplink TA value, to keep the uplink synchronization. If the TA value of a certain terminal device needs to be corrected, the network device will transmit a TA command to this terminal device, and request it to adjust the uplink TA value. The TA command is transmitted to the terminal device through a medium access control (MAC) control element (CE).

In the related art, in order to keep the uplink synchronization, the network device may configure a timer (referred to as time Alignment Timer) for the terminal device through RRC signaling. The terminal device may use this timer to determine whether the uplink is synchronized. When the terminal device receives the TA command (from RAR or MAC CE), the terminal device starts or restarts the timer.

During the running period of the timer, the terminal device considers that the uplink is synchronized, that is, the TA value maintained by the terminal device is valid. If the timer expires, the terminal device considers that the uplink is out of synchronization; and if the terminal device has uplink data to be transmitted, it needs to trigger the random access to re-acquire the TA value. That is to say, when the timer expires, the terminal device may only transmit the preamble on the uplink.

In the terrestrial network, the TA value between the terminal device and the network device changes slowly, and the above-mentioned related technology may keep the uplink synchronization of the terminal device. However, compared with the conventional terrestrial network, in the NTN network (especially the LEO scenario), the TA value between the terminal device and the network device changes rapidly and greatly. When the above-mentioned related technology is adopted, the network device must measure the uplink transmission of the terminal device frequently, so as to update the TA value of the terminal device. However, in some scenarios (for example, when the terminal device does not have a lot of uplink transmission for measurement, or when the network device needs to measure a large number of terminal devices), the network device may not be able to control the real-time update of the TA values of the terminal devices. In this case, the TA value of the terminal device is not updated timely, resulting in frequent uplink out-of-synchronization. Furthermore, when the terminal device has uplink data to be transmitted, it needs to perform the random access process again, thereby causing a large signaling overhead and consumption of random access resources.

In order to solve the above technical problem, the embodiments of the present disclosure propose a communication method. For ease understanding of the communication method shown in the present disclosure, the architecture of the communication system in the present disclosure is first described with reference to FIG. 2 and FIG. 3.

Figure 2:
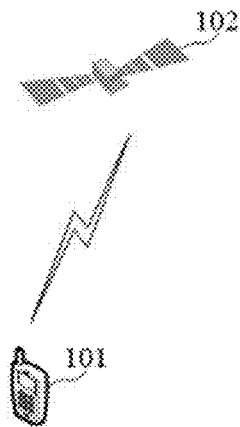
FIG. 2 is a schematic diagram illustrating an architecture of a communication system provided by an embodiment of the present disclosure.

FIG. 2 is a schematic diagram illustrating an architecture of the communication system provided by an embodiment of the present disclosure. Referring to FIG. 2, a terminal device 101 and a satellite 102 are included, and wireless communication may be performed between the terminal device 101 and the satellite 102. The network formed between the terminal device 101 and the satellite 102 may also be referred to as NTN. In the architecture of the communication system shown in FIG. 2, the satellite 102 has the function of a base station, and the terminal device 101 may directly communicate with the satellite 102. Under this system architecture, the satellite 102 may be referred to as a network device.

Figure 3:
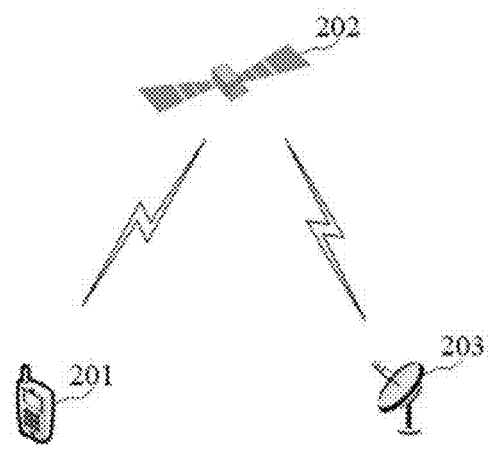
FIG. 3 is a schematic diagram illustrating the architecture of another communication system provided by an embodiment of the present disclosure.

FIG. 3 is a schematic diagram illustrating the architecture of another communication system provided by an embodiment of the present disclosure. Referring to FIG. 3, a terminal device 201, a satellite 202 and a base station 203 are included, wireless communication may be performed between the terminal device 201 and the satellite 202, and the satellite 202 may communicate with the base station 203. The network formed among the terminal device 201, the satellite 202 and the base station 203 may also be referred to as NTN. In the architecture of the communication system shown in FIG. 3, the satellite 202 does not have the function of the base station, and the communication between the terminal device 201 and the base station 203 needs to be relayed through the satellite 202. Under this system architecture, the base station 203 may be referred to as a network device.

In the present disclosure, in a scenario where the TA value varies greatly (for example, in NTN), the terminal device determines and adjusts the TA value, based on its own positioning capability, and the terminal device reports the determined TA value to the network device. Through this process, the real-time update and adjustment of the TA value of the terminal device are ensured, frequent uplink out-of-synchronization is avoided, and thus the consumption of random access resources and signaling overhead that are caused by frequent uplink out-of-synchronization can be avoided. Further, through this process, the network device can track the update status of the TA value of the terminal device in real time, which is beneficial to the uplink scheduling of the terminal device, reducing the scheduling delay and service transmission delay.

Hereinafter, the technical solutions shown in the present disclosure will be described in detail through the specific embodiments. It should be noted that the following embodiments may exist independently or be combined with each other, and the same or similar contents will not be repeated in different embodiments.

Figure 4:
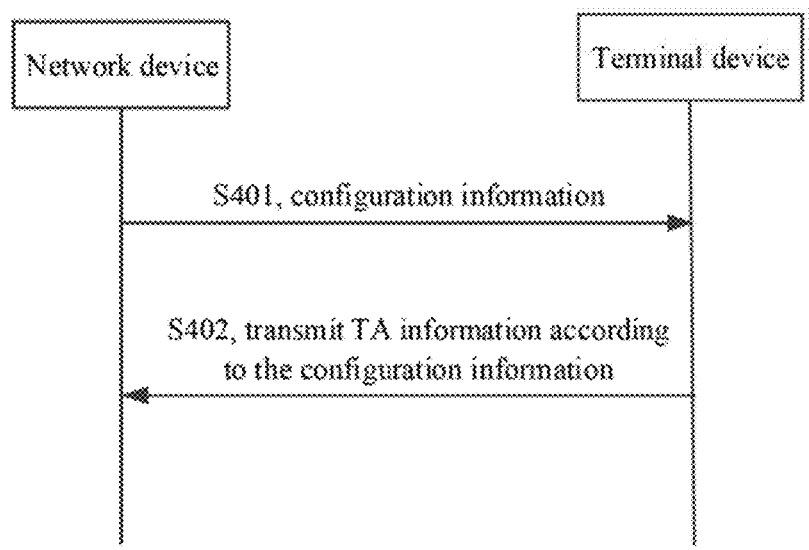
FIG. 4 is a schematic flowchart of a communication method provided by an embodiment of the present disclosure.

FIG. 4 is a schematic flowchart of a communication method provided by an embodiment of the present disclosure. As shown in FIG. 4, the method of this embodiment includes operations as follows.

At S401, the network device transmits configuration information to the terminal device.

The configuration information may instruct the terminal device to report the information required for the TA information to the network device.

In an implementation, the configuration information is used to indicate a reporting mode of the TA information. The reporting mode may be any of periodic reporting, aperiodic reporting, and semi-persistent reporting.

The periodic reporting means that the terminal device periodically reports the TA information to the network device. For example, the terminal device reports the TA information to the network device at preset time intervals. The preset time interval may be indicated by the network device in the configuration information, or may also be determined by the terminal device autonomously, or may be negotiated between the network device and the terminal device in advance.

The aperiodic reporting means that the time at which the terminal device reports the TA information to the network device is not periodic. For example, the terminal device may report the TA information to the network device according to a preset reporting trigger condition. Whenever the reporting trigger condition is satisfied, the terminal device reports the TA information to the network device. The reporting trigger condition may be indicated by the network device in the configuration information, or may also be determined by the terminal device autonomously, or may be negotiated between the network device and the terminal device in advance. Alternatively, whenever the network device needs to know the TA information of the terminal device, the network device may instruct, through the indication information, the terminal device to report the TA information once.

The semi-persistent reporting means that the terminal device periodically reports the TA information to the network device within a certain period of time. A start time and an end time of this period of time may be indicated by the network device in the configuration information, or may also be determined by the terminal device autonomously, or may be negotiated between the network device and the terminal device in advance. Alternatively, the network device may also indicate the start time and the end time to the terminal device through the indication information as required.

In an implementation, the configuration information may indicate a physical channel carrying the TA information. The physical channel may be a physical uplink shared channel (PUSCH) or a physical uplink control channel (PUCCH).

In an implementation, the configuration information may also indicate the reporting mode of the TA information and the physical channel carrying the TA information at the same time. When the configuration information indicates the above two kinds of information at the same time, such two kinds of information may be indicated explicitly or implicitly. For example, if the configuration information indicates that the reporting mode is the periodic reporting, it is implicitly indicated that the physical channel carrying the TA information is the PUCCH. If the configuration information indicates that the reporting mode is the aperiodic reporting, it implicitly indicates that the physical channel carrying the TA information is the PUSCH.

In an implementation, the configuration information is configured to indicate any of the following cases:

Case 1: The reporting mode is the periodic reporting, and the physical channel carrying the TA information is the PUCCH;

Case 2: The reporting mode is the aperiodic reporting, and the physical channel carrying the TA information is the PUSCH;

Case 3: The reporting mode is the semi-persistent reporting, and the physical channel carrying the TA information is the PUCCH; and Case 4: The reporting mode is the semi-persistent reporting, and the physical channel carrying the TA information is the PUSCH.

In this embodiment, the configuration information may be RRC signaling. That is, the network device carries the configuration information in the RRC signaling and transmits it to the terminal device. For example, the RRC signaling may be RRC reconfiguration signaling or the like.

It should be noted that, the network device may indicate the reporting mode in the configuration information in multiple ways, which are not limited in this embodiment. In the following, it is described in connection with some possible examples.

In one example, the configuration information includes a first information field. A information value in the first information field is used to indicate the reporting mode. For example, in a case where the information value in the first information field is 1, it means that the reporting mode is the periodic reporting. In a case where the information value in the first information field is 2, it indicates that the reporting mode is the aperiodic reporting. In a case where the information value in the first information field is 3, it indicates that the reporting mode is the semi-persistent reporting.

Alternatively, the information value in the first information field is used to indicate the different situations from the above. For example, in a case where the information value in the first information field is 1, it means that the reporting mode is the periodic reporting, and the physical channel carrying the TA is the PUCCH (Case 1). In a case where the information value in the first information field is 2, it means that the reporting mode is the aperiodic reporting, and the physical channel carrying the TA is the PUSCH (Case 2). In a case where the information value in the first information field is 3, it indicates that the reporting mode is the semi-persistent reporting, and the physical channel carrying the TA is the PUCCH (Case 3). In a case where the information value in the first information field is 4, it means that the reporting mode is the semi-persistent reporting, and the physical channel carrying the TA is the PUSCH (Case 4).

In another example, different reporting modes correspond to different information fields in the configuration information. For example, the periodic reporting corresponds to an information field 1, the aperiodic reporting corresponds to an information field 2, and the semi-persistent reporting corresponds to an information field 3. In a case where the information field 1 exists in the configuration information, it indicates that the reporting mode is the periodic reporting. In a case where the information field 2 exists in the configuration information, it indicates that the reporting mode is the aperiodic reporting. In case where the information field 3 exists in the configuration information, it indicates that the reporting mode is the semi-persistent reporting.

Alternatively, the above different cases correspond to different information fields in the configuration information. For example, Case 1 corresponds to an information field 1, Case 2 corresponds to an information field 2. Case 3 corresponds to an information field 3, and Case 4 corresponds to an information field 4. In a case where the information field 1 exists in the configuration information, Case 1 is indicated. In a case where the information field 2 exists in the configuration information, Case 2 is indicated. In a case where the information field 3 exists in the configuration information, Case 3 is indicated. In a case where the information field 4 exists in the configuration information, Case 4 is indicated.

It should be understood that, when the reporting modes indicated by the configuration information are different, the contents included in the configuration information may also be different. This will be described in detail with reference to the embodiments shown in FIG. 5 to FIG. 11 in the following, and will not be repeated here.

At S402, the terminal device transmits the TA information to the network device, according to the configuration information.

The TA information is configured to indicate the TA value determined by the terminal device.

In the embodiments of the present disclosure, the terminal device has a self-positioning capability. The terminal device may determine, based on the self-positioning capability, TA values corresponding to different times, and continuously adjust the transmitting time of the uplink data according to the determined TA values.

In an implementation, the terminal device may determine the TA value according to its own location information and the location information of the network device. For example, the TA value is determined according to a distance between the terminal device and the network device. In an example, the terminal device may calculate, at preset intervals, the TA value according to the distance between itself and the network device. The embodiments of the present disclosure do not particularly limit the specific ways in which the terminal device calculates the TA value.

In the NTN network, in a case where a satellite serves as the network device, the location information of the network device may change all the time, and the trajectory of the network device is consistent with that of the satellite. Therefore, the location information of the network device may be determined based on ephemeris information. The ephemeris information may also be referred to as an ephemeris, which refers to a table of satellite orbit parameters, that is, it uses table data to illustrate predetermined locations of the satellite at regular intervals. Therefore, the terminal device may determine, according to the ephemeris information, the location information of the network device at different times.

In the embodiments of the present disclosure, the terminal device determines and adjusts the TA value based on its own location information and the location information of the network device. As such, it ensures the real-time update and adjustment of the TA value of the terminal device, avoids frequent uplink out-of-synchronization, and further enables consumption of random access resources and signaling overhead that are caused by frequent uplink out-of-synchronization to be avoided.

In an implementation, the terminal device transmits the TA information to the network device in the reporting mode of the TA information indicated by the configuration information. That is, when the reporting mode indicated by the configuration information is the periodic reporting, the terminal device periodically transmits the TA information to the network device. When the reporting mode indicated by the configuration information is the aperiodic reporting, the terminal device transmits the TA information to the network device aperiodically. When the reporting mode indicated by the configuration information is the semi-persistent reporting, the terminal device transmits the TA information to the network device semi-persistently.

In an implementation, the terminal device transmits the TA information to the network device through the physical channel carrying the TA information as indicated by the configuration information. That is, when the configuration information indicates that the physical channel carrying the TA information is the PUCCH, the terminal device transmits the TA information to the network device through the PUCCH. When the configuration information indicates that the physical channel carrying the TA information is the PUSCH, the terminal device transmits the TA information to the network device through the PUSCH.

It should be noted that, when the reporting modes indicated by the configuration information are different, the processes of reporting the TA information by the terminal device to the network device are also different. In the following, different reporting modes will be described separately in conjunction with the embodiments shown in FIG. 5 to FIG. 11, which will not be repeated here.

It should be understood that the TA information reported by the terminal device to the network device each time indicates the TA value currently determined by the terminal device. In this way, the network device may know the latest TA value of the terminal device according to the received TA information, so as to track the change of the TA value of the terminal device. This is beneficial for the network device to subsequently perform dynamic uplink scheduling for the terminal device, so that the scheduling of the network device can match the real-time TA value of the terminal device instead of adopting a maximum TA value supported by the system all the time. As such, the scheduling delay can be reduced, thereby reducing the service transmission delay.

In an implementation, the TA information reported by the terminal device to the network device includes an index corresponding to the TA value. For example, the TA index may be in a range from 0 to N. Different indices correspond to different TA values, and the TA value corresponding to each index may be positive or negative. After the terminal device calculates the TA value based on its own positioning capability, it searches an index table to determine an index corresponding to the TA value, and transmits the index to the network device. It can be understood that the length of the TA information can be reduced by transmitting the index corresponding to the TA value.

In one example, the TA information may include an index corresponding to a first TA value. The first TA value is a real-time TA value determined by the terminal device, that is, the TA value newly calculated by the terminal device. That is to say, an index corresponding to the real-time absolute TA value is reported by the terminal device to the network device.

In another example, the TA information may include an index corresponding to a second TA value. The second TA value is a change of the real-time TA value determined by the terminal device relative to a last reported TA value. That is to say, an index corresponding to the incremental TA value is reported by the terminal device to the network device. It can be understood that, by reporting the index corresponding to the incremental TA value and the index corresponding to the absolute TA value, the length of the TA information can be further reduced.

In the communication method provided by this embodiment, the terminal device receives the configuration information from the network device, and transmits the TA information to the network device according to the configuration information. Through this process, the real-time update and adjustment of the TA value of the terminal device is ensured, frequent uplink out-of-synchronization is avoided, and thus the consumption of random access resources and signaling overhead that are caused by frequent uplink out-of-synchronization can be avoided. Further, through this process, the network device can track the update status of the TA value of the terminal device in real time, which is beneficial to the uplink scheduling for the terminal device, reducing the scheduling delay and service transmission delay.

Figure 5:
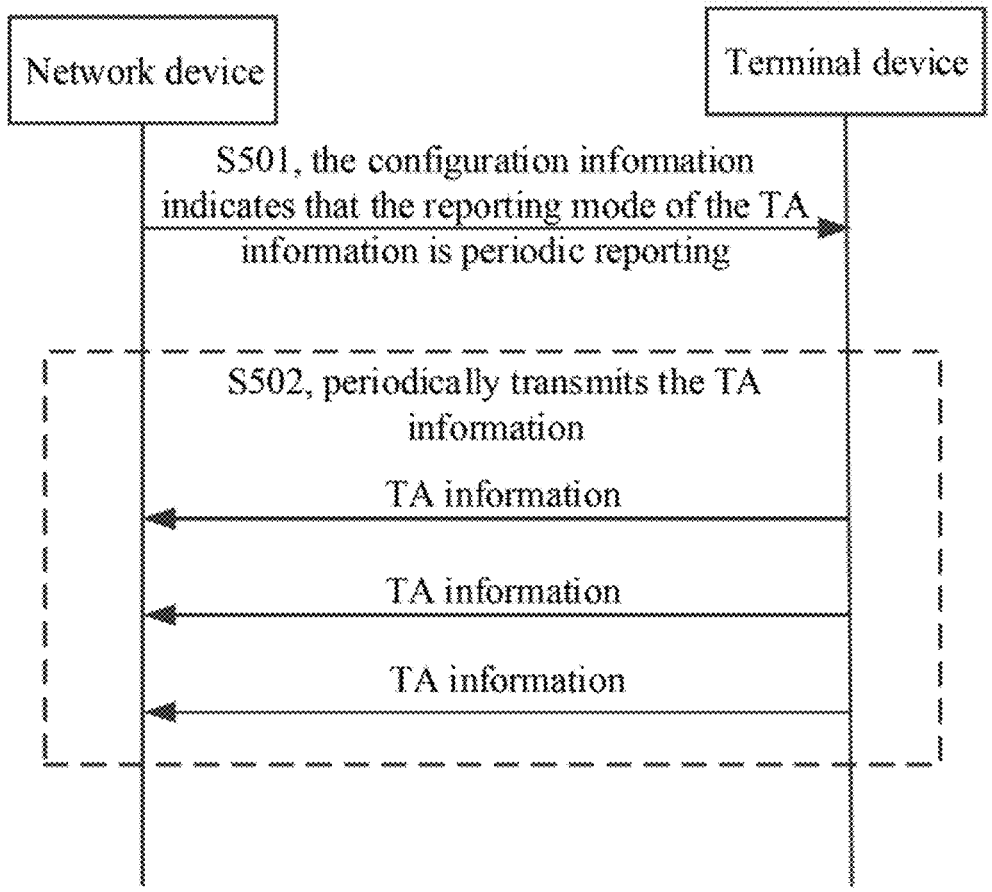
FIG. 5 is a schematic flowchart of another communication method provided by an embodiment of the present disclosure.

FIG. 5 is a schematic flowchart of another communication method provided by an embodiment of the present disclosure. This embodiment exemplifies the process of periodically reporting the TA information. As shown in FIG. 5, the method of this embodiment may include operations as follows.

At S501, the network device transmits configuration information to the terminal device, where the configuration information indicates that the reporting mode of the TA information is the periodic reporting.

In an example, the periodic TA information may be carried in PUCCH resources. Exemplarily, the configuration information may include at least one of the following information:

time information, configured to indicate a time point at which the TA information is periodically reported each time; and resource information, configured to indicate a PUCCH resource used for reporting the TA information.

In this way, according to the configuration information, the terminal device may determine the time point at which the TA information is periodically reported each time, and the PUCCH resource occupied for reporting the TA information each time. Correspondingly, the network device may receive the TA information at the corresponding time point and the corresponding PUCCH resource.

In an implementation, the time information may include at least one of the following information: period information, configured to indicate a reporting period for reporting the TA information; and offset information, configured to indicate a time slot offset within each period. In this way, according to the period information and the offset information, the time point at which the TA information is reported periodically by the terminal device each time may be determined.

In an implementation, the configuration information may further include: at least one bandwidth part (BWP) configured for the terminal device, and PUCCH resources corresponding to each BWP. Further, the configuration information may also indicate a PUCCH resource of each BWP that is used for reporting the TA information.

In another example, the periodic TA information may also be carried in a PUSCH resource. The PUSCH resource may be a resource dynamically scheduled by the network device. For example, the network device periodically schedules the PUSCH resources, so that the terminal device may periodically report the TA information through the PUSCH resources. The PUSCH resource may also be a resource preconfigured by the network device for the terminal device (for example, a configured grant CG resource), and the terminal device periodically reports the TA information on the preconfigured resource.

At S502, the terminal device periodically transmits the TA information to the network device.

In this embodiment, after the terminal device receives the configuration information, in a case where the reporting mode indicated by the configuration information is the periodic reporting, the terminal device starts to periodically transmit the TA information to the network device.

In an implementation, according to the time information and PUCCH resource information indicated by the configuration information, the terminal device periodically transmits the TA information to the network device through the PUCCH. For example, the terminal device determines, according to the time information, the time point at which the TA information is reported each time; and when reporting the TA information each time, the terminal device transmits the TA information on the PUCCH resource of the currently activated BWP that is used for reporting the TA information.

Figure 6:
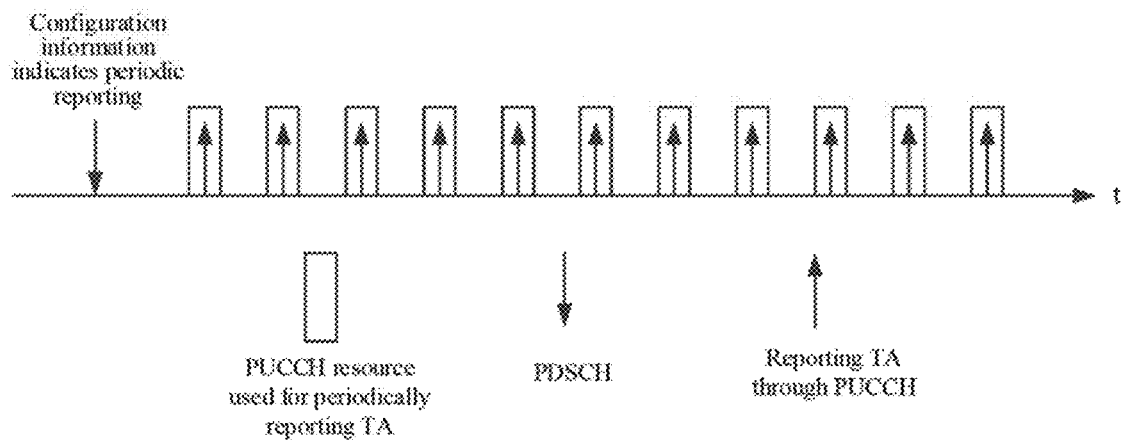
FIG. 6 is a schematic sequence diagram for periodic reporting of TA information provided by an embodiment of the present disclosure.

The periodic TA reporting is illustrated below with reference to FIG. 6. FIG. 6 is a schematic sequence diagram for the periodic reporting of the TA information provided by an embodiment of the present disclosure. As shown in FIG. 6, it is assumed that the rectangular boxes represent the PUCCH resources configured by the network device for the terminal device to periodically report the TA information, the upward arrow indicates that the terminal device transmits the TA information on the PUCCH resource, and the downward arrow indicates that the terminal receives a PDSCH.

Referring to FIG. 6, the terminal device receives the configuration information through the PDSCH, and the configuration information indicates that the TA information is periodically reported. Therefore, after receiving the configuration information, the terminal device starts to periodically transmits the TA information to the network device through the preconfigured PUCCH resources used for reporting the TA information. Correspondingly, the network device may periodically receive the TA information on the corresponding PUCCH resources. As can be seen from FIG. 6, after receiving the configuration information in which the periodic reporting of the TA information is indicated, the terminal device may start the periodic reporting of the TA information without waiting for other indication information.

In this embodiment, the terminal device periodically reports the TA information to the network device, so that the network device can know the change of the TA value of the terminal device in time. This is beneficial for the network device to subsequently perform dynamic uplink scheduling for the terminal device, so that the scheduling of the network device can match the real-time TA value of the terminal device instead of adopting a maximum TA value supported by the system all the time. As such, the scheduling delay can be reduced, thereby reducing the service transmission delay.

Figure 7:
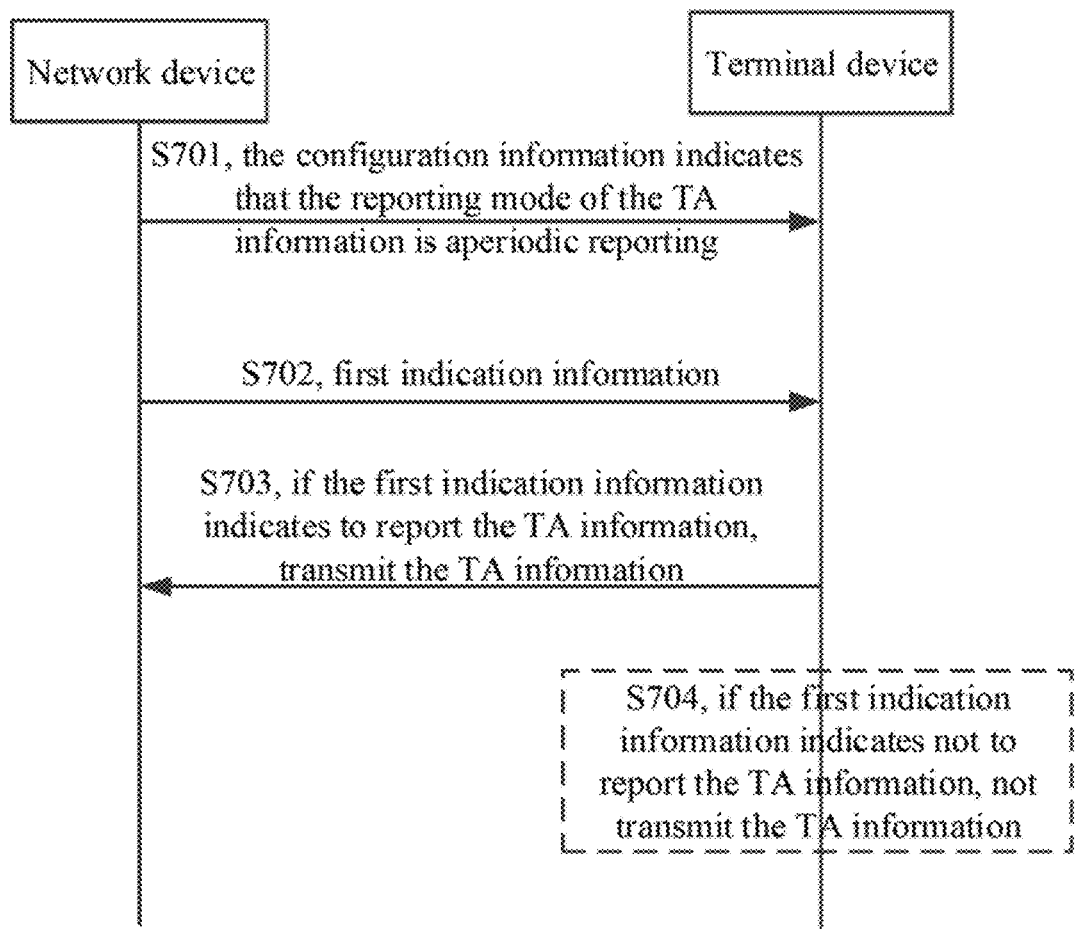
FIG. 7 is a schematic flowchart of a further communication method provided by an embodiment of the present disclosure.

FIG. 7 is a schematic flowchart of a further communication method provided by an embodiment of the present disclosure. This embodiment exemplifies the process of aperiodically reporting the TA information. As shown in FIG. 7, the method of this embodiment may include operations as follows.

At S701, the network device transmits configuration information to the terminal device, where the configuration information indicates that the reporting mode of the TA information is the aperiodic reporting.

At S702, the network device transmits first indication information to the terminal device, where the first indication information is configured to indicate whether to transmit the TA information.

In this embodiment, after receiving the configuration information, the terminal device determines, according to the configuration information, that the aperiodic reporting mode needs to be adopted. In this case, the terminal device does not immediately report the TA information to the network device, but waits for the first indication information transmitted from the network device. Correspondingly, when the network device, according to its own requirements, needs to know the TA information of the terminal device, the network device transmits the first indication information to the terminal device to instruct the terminal device to report the current TA information.

The first indication information may include a target resource for reporting the TA information, so as to instruct the terminal device to transmit the TA information on the target resource. The first indication information may be carried in the MAC CE, or in the PDCCH. The target resource can be any resource used for uplink transmission. For example, the target resource may be a PUCCH resource or a PUSCH resource.

In an example, the target resource is a PUSCH resource, and the first indication information is carried in a PDCCH for scheduling the PUSCH resource. For example, the first indication information may be downlink control information (DCI) in the PDCCH information. Exemplarily, the network device dynamically schedules the PUSCH resource in the PDCCH information (for example, indicating the allocated PUSCH resource through DCI). In addition, the network device also indicates in the PDCCH information whether to report the TA information in the currently scheduled PUSCH resource. For example, when a second information field exists in the PDCCH information, or when the information value in the second information field is a first preset value (for example, 1), it is indicated to transmit the TA information on the currently scheduled PUSCH resource. When the second information field does not exist in the PDCCH information, or when the information value in the second information field is a second preset value (for example, 0), it is indicated not to transmit the TA information on the currently scheduled PUSCH resource.

In another example, the target resource is a PUCCH resource. For example, the network device pre-configures a PUCCH resource for reporting the TA information of the terminal device. When the network device needs to know the TA information of the terminal device, the network device transmits the first indication information to the terminal device, to instruct the terminal device to transmit the TA information on the preconfigured PUCCH resource.

At S703, in a case where the first indication information indicates to transmit the TA information, the terminal device transmits the TA information to the network device.

At S704, in a case where the first indication information indicates not to transmit the TA information, the terminal device does not transmit the TA information to the network device.

Exemplarily, the terminal device receives the PDCCH information for scheduling a PUSCH resource, and in a case where the PDCCH information further indicates to transmit the TA information on the currently scheduled PUSCH resource, the terminal device transmits the TA information on the currently scheduled PUSCH resource.

In an example, when the terminal device transmits the TA information through the PUSCH resource, the TA information may be carried in the MAC CE of the PUSCH.

In this embodiment, when the TA information is reported in the aperiodic reporting mode, the terminal device reports the TA information according to the indication of the first indication information. That is, the terminal device reports the TA information to the network device once, only when the first indication information indicates to transmit the TA information.

Figure 8:
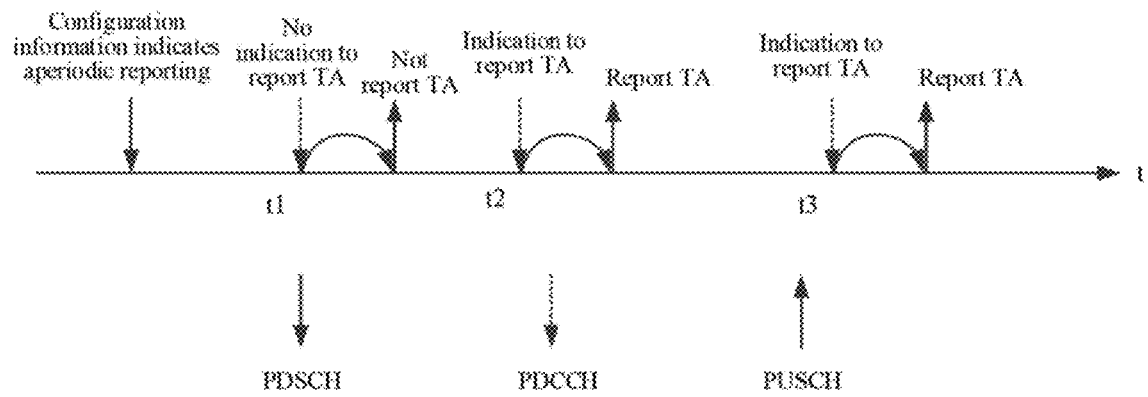
FIG. 8 is a schematic sequence diagram for aperiodic reporting of TA information provided by an embodiment of the present disclosure.

FIG. 8 is a schematic sequence diagram for the aperiodic reporting of the TA information provided by an embodiment of the present disclosure. As shown in FIG. 8, the downward solid arrow indicates that the terminal device receives the PDSCH, the downward dashed arrow indicates that the terminal device receives the PDCCH, and the upward arrow indicates that the terminal device transmits the PUSCH.

Referring to FIG. 8, the terminal device receives the configuration information through the PDSCH, and the configuration information indicates that the TA information is aperiodically reported. At time t1, the terminal device receives the PDCCH for scheduling a PUSCH, and the PDCCH does not indicate to report the TA information. Therefore, the terminal device does not report the TA information in the currently scheduled PUSCH. At time t2, the terminal device receives the PDCCH used for scheduling a PUSCH, and the PDCCH indicates to report the TA information. Therefore, the terminal device reports the TA information in the currently scheduled PUSCH. At time t3, the terminal device receives the PDCCH used for scheduling a PUSCH, and the PDCCH indicates to report the TA information. Therefore, the terminal device reports the TA information in the currently scheduled PUSCH.

In this embodiment, the terminal device reports the TA information to the network device in the aperiodic reporting mode, so that the network device can know the change of the TA value of the terminal device in time when needed. This is beneficial for the network device to subsequently perform dynamic uplink scheduling for the terminal device, so that the scheduling of the network device can match the real-time TA value of the terminal device instead of adopting a maximum TA value supported by the system all the time. As such, the scheduling delay can be reduced, thereby reducing the service transmission delay. Further, since when the network device needs, according to its own requirements, to know the TA information of the terminal device, the network device would transmit the first indication information to the terminal device, this enables the signaling overhead to be reduced.

Figure 9:
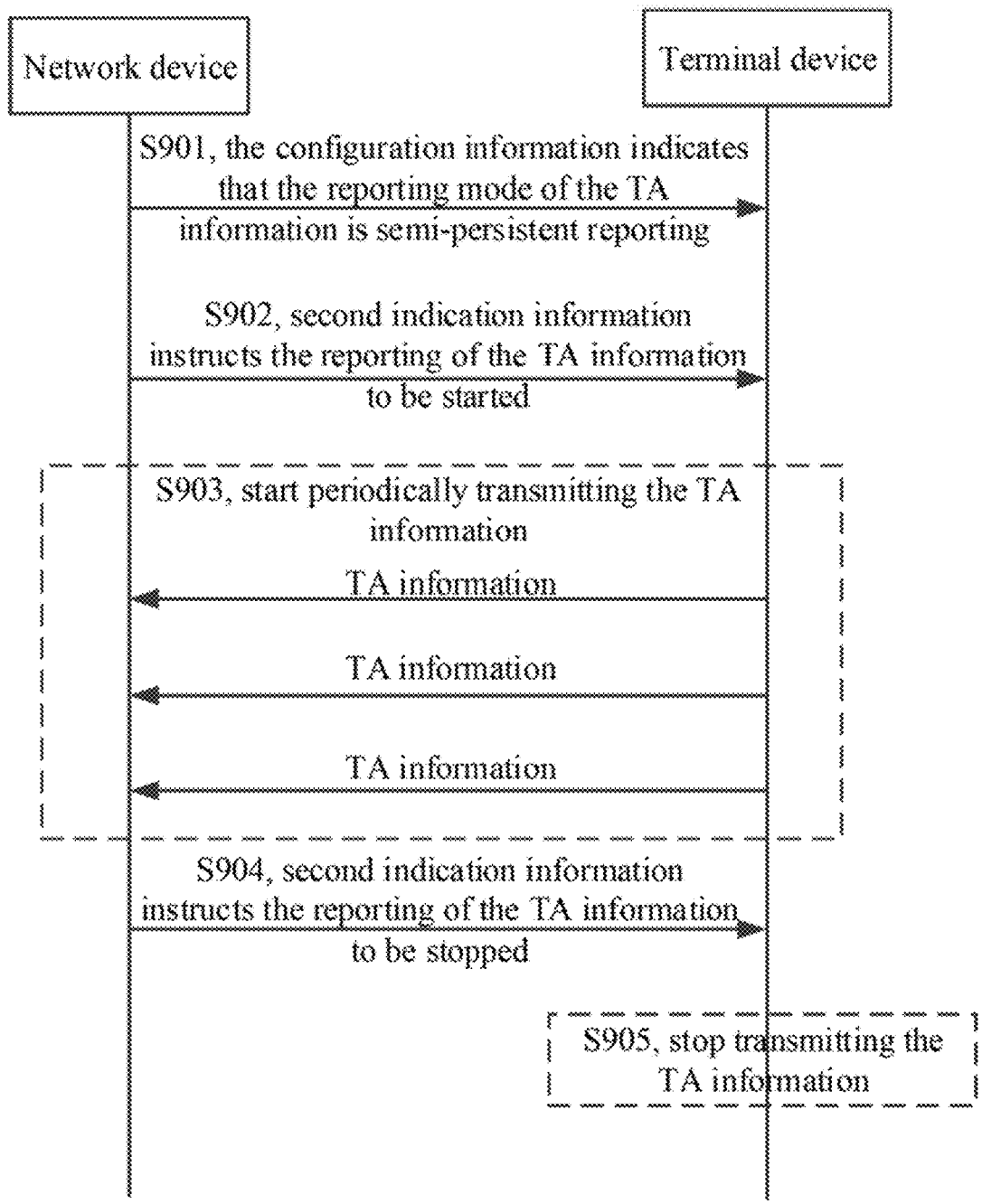
FIG. 9 is a schematic flowchart of yet another communication method provided by an embodiment of the present disclosure.

FIG. 9 is a schematic flowchart of yet another communication method provided by an embodiment of the present disclosure. This embodiment exemplifies the process of semi-persistently reporting the TA information. As shown in FIG. 9, the method of this embodiment may include operations as follows.

At S901, the network device transmits configuration information to the terminal device, where the configuration information indicates that the reporting mode of the TA information is the semi-persistent reporting.

In this embodiment, when the semi-persistent reporting mode is adopted, the TA information may be carried on a PUCCH resource or a PUSCH resource. Therefore, in a case where the configuration information indicates the semi-persistent reporting, it may also indicate the physical channel carrying the TA information at the same time. Therefore, this embodiment includes the following two cases: the physical channel carrying the TA information is the PUCCH, and the physical channel carrying the TA information is the PUSCH.

In a case where the physical channel carrying the TA information is the PUCCH, the TA information is carried on a PUCCH resource. The PUCCH resource may be pre-configured in configuration information. In an example, the configuration information includes at least one of the following information:

time information, configured to indicate a time point at which the TA information is periodically reported each time; and resource information, configured to indicate a PUCCH resource used for reporting the TA information.

In this way, according to the configuration information, the terminal device may determine the time point at which the TA information is periodically reported each time, and the PUCCH resource occupied for reporting the TA information each time. Correspondingly, the network device may receive the TA information at the corresponding time point and on the corresponding PUCCH resource.

In an implementation, the time information may include at least one of the following information: period information, configured to indicate a reporting period for reporting the TA information; and offset information, configured to indicate a time slot offset within each period. In this way, according to the period information and the offset information, the time point at which the TA information is reported periodically by the terminal device each time may be determined.

In an implementation, the configuration information may further include: at least one bandwidth part (BWP) configured for the terminal device, and PUCCH resources corresponding to each BWP. Further, the configuration information may also indicate a PUCCH resource of each BWP that is used for reporting the TA information.

In a case where the physical channel carrying the TA information is the PUSCH, the TA information is carried on a PUSCH resource. The PUSCH resource may be dynamically scheduled by the network device through the PDCCH, or may be pre-configured by the network device for the terminal device (for example, a pre-configured CG resource).

At S902, the network device transmits second indication information to the terminal device, where the second indication information is configured to instruct the reporting of the TA information to be started.

In this embodiment, after receiving the configuration information, the terminal device determines that the semi-persistent reporting mode needs to be adopted according to the configuration information. In this case, the terminal device does not immediately report the TA information to the network device, but waits for the second indication information transmitted from the network device. Correspondingly, when the network device, according to its own requirements, needs to know the TA information of the terminal device, the network device transmits the second indication information to the terminal device. The second indication information is configured to instruct the reporting of the TA information to be started. In other words, the second indication information is configured to instruct the semi-persistent reporting of the TA information to be activated.

In an implementation, the second indication information may be carried through the MAC CE. Exemplarily, the network device transmits the downlink PDSCH to the terminal device, and the second indication information is carried in the MAC CE of the PDSCH.

In an implementation, the second indication information may be carried through the PDCCH. For example, the second indication information may be specifically carried in the DC of the PDCCH.

Exemplarily, the second indication information includes a third information field. When the information value in the third information field is 1, it means starting the reporting of the TA information (or in other words, it means activating the semi-persistent reporting of the TA information). When the information value in the third information field is 0, it means stopping the reporting of the TA information (or in other words, it means deactivating the semi-persistent reporting of the TA information).

At S903, the terminal device starts to periodically transmit the TA information to the network device.

Based on the second indication information received in S902, the terminal device starts to periodically report the TA information to the network device. Exemplarily, in a case where the configuration information indicates that the physical channel carrying the TA information is the PUCCH, the terminal device periodically reports the TA information to the network device through the PUCCH resource, according to the time information and resource information in the configuration information. Alternatively, if the configuration information indicates that the physical channel carrying the TA information is the PUSCH, the terminal device periodically reports the TA information to the network device through the PUSCH resource.

It should be noted that, when the physical channel carrying the TA information is the PUSCH, the network device may also periodically schedule the PUSCH resources, so that the terminal device may periodically transmit the TA information on the PUSCH resources. Alternatively, the network device may preconfigure PUSCH resources (for example, CG resources) for the terminal device, so that the terminal device may periodically transmit the TA information on the preconfigured PUSCH resources.

At S904 the network device transmits the second indication information to the terminal device, where the second indication information is configured to instruct the reporting of the TA information to be stopped.

In a case where the network device does not need to know the TA information of the terminal device, the second indication information may then also be transmitted to the terminal device. The second indication information is configured to instruct the reporting of the TA information to be stopped, or in other words, the second indication information is configured to deactivate the semi-persistent reporting of the TA information. For example, the information value in the third information field of the second indication information is set as 0.

At S905, the terminal device stops transmitting the TA information to the network device.

Based on the second indication information received in S904, the terminal device stops periodically transmitting the TA information to the network device.

In the following, the process of semi-persistently reporting the TA information through PUCCH resources and the process of semi-persistently reporting the TA information through PUSCH resources are described respectively with reference to FIG. 10 and FIG. 11.

Figure 10:
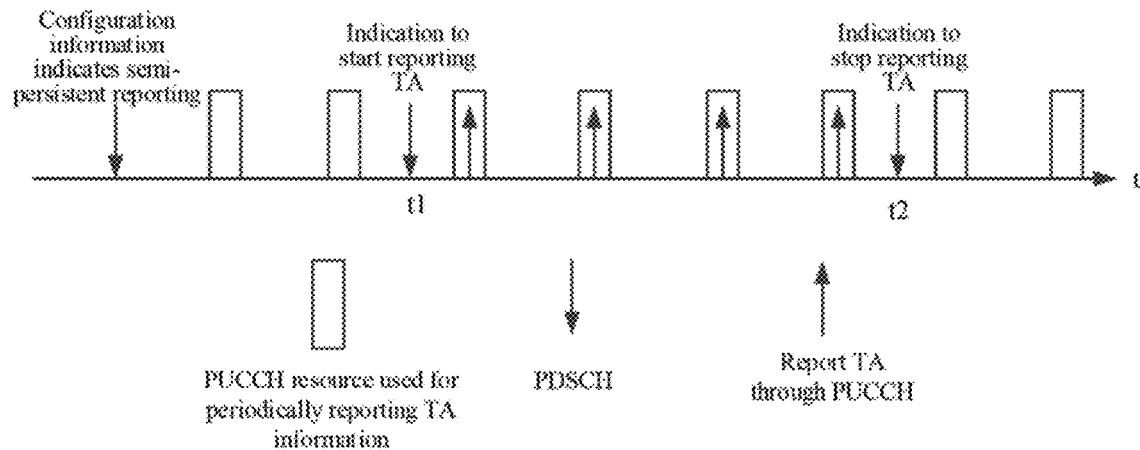
FIG. 10 is a schematic sequence diagram for semi-persistent reporting of TA information through a PUCCH resource provided by an embodiment of the present disclosure.

FIG. 10 is a schematic sequence diagram for the semi-persistent reporting of the TA information through PUCCH resources provided by an embodiment of the present disclosure. As shown in FIG. 10, it is assumed that the rectangular boxes represent the PUCCH resources configured by the network device for the terminal device to periodically report the TA information, the upward arrow indicates that the terminal device transmits the TA information on the PUCCH resource, and the downward arrow indicates that the terminal receives a PDSCH.

Referring to FIG. 10, the terminal device receives the configuration information through the PDSCH, and the configuration information indicates that the semi-persistent reporting of TA information is performed through PUCCH resources. After receiving the configuration information, the terminal device does not immediately start transmitting the TA information to the network device through the PUCCH resources. Assuming that the terminal device receives a PDSCH at time t1, and the MAC CE of the PDSCH indicates to start reporting the TA information, the terminal device starts to periodically transmit the TA information to the network device through the pre-configured PUCCH resources. Correspondingly, the network device may periodically receive the TA information on the PUCCH resources. At time t2, the terminal device receives a PDSCH, and the MAC CE of the PDSCH indicates to stop reporting the TA information, then the terminal device stops periodically transmitting the TA information to the network device through the PUCCH resources.

Figure 11:
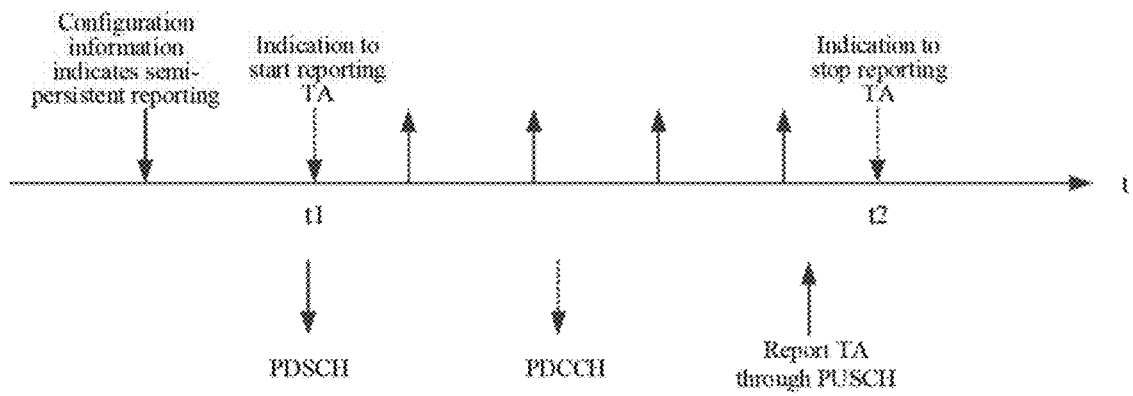
FIG. 11 is a schematic sequence diagram for semi-persistent reporting of TA information through a PUSCH resource provided by an embodiment of the present disclosure.

FIG. 11 is a schematic sequence diagram for the semi-persistent reporting of the TA information through PUSCH resources provided by an embodiment of the present disclosure. As shown in FIG. 11, the downward solid arrow indicates that the terminal device receives the PDSCH, the downward dashed arrow indicates that the terminal device receives the PDCCH, and the upward arrow indicates that the terminal device transmits the TA information on the PUSCH resources.

Referring to FIG. 11, the terminal device receives the configuration information through the PDSCH, and the configuration information indicates that the semi-persistent reporting of TA information is performed through PUSCH resources. After receiving the configuration information, the terminal device does not immediately start transmitting the TA information to the network device through the PUSCH resources. Assuming that the terminal device receives a PDCCH at time t1, and the PDCCH indicates to start reporting the TA information, then the terminal device starts to periodically transmit the TA information to the network device through the PUSCH resources. Correspondingly, the network device may periodically receive the TA information on the PUSCH resources. At time t2, the terminal device receives a PDCCH, and the PDCCH indicates to stop reporting the TA information, then the terminal device stops periodically transmitting the TA information to the network device through the PUSCH resources.

In this embodiment, the terminal device reports the TA information to the network device in the semi-persistent reporting mode, so that the network device can know the change of the TA value of the terminal device in time when needed. This is beneficial for the network device to subsequently perform dynamic uplink scheduling for the terminal device, so that the scheduling of the network device can match the real-time TA value of the terminal device instead of adopting a maximum TA value supported by the system all the time. As such, the scheduling delay can be reduced, thereby reducing the service transmission delay. Further, since when the network device needs, according to its own requirements, to know the TA information of the terminal device, the network device would transmit the second indication information to the terminal device, this enables the signaling overhead to be reduced.

Figure 12:
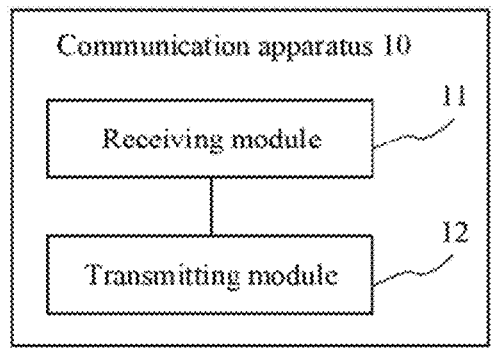
FIG. 12 is a schematic structural diagram of a communication apparatus provided by an embodiment of the present disclosure.

FIG. 12 is a schematic structural diagram of a communication apparatus provided by an embodiment of the present disclosure. The communication apparatus 10 may be provided in a terminal device. Referring to FIG. 12, the communication apparatus 10 includes a receiving module 11 and a transmitting module 12.

The receiving module 11 is configured to receive configuration information from a network device.

The transmitting module 12 is configured to transmit timing advance TA information to the network device, according to the configuration information, where the TA information is configured to indicate a TA value determined by the terminal device.

In a possible implementation, the configuration information is configured to indicate at least one of the following information:
  a reporting mode of the TA information, the reporting mode including any one of periodic reporting, aperiodic reporting, and semi-persistent reporting; and
  a physical channel carrying the TA information, the physical channel being a physical uplink shared channel PUSCH or a physical uplink control channel PUCCH.

In a possible implementation, the configuration information is configured to indicate any one of the following cases:
  the reporting mode is the periodic reporting, and the physical channel carrying the TA information is the PUCCH; or
  the reporting mode is the aperiodic reporting, and the physical channel carrying the TA information is the PUSCH; or
  the reporting mode is the semi-persistent reporting, and the physical channel carrying the TA information is the PUCCH: or
  the reporting mode is the semi-persistent reporting, and the physical channel carrying the TA information is the PUSCH.

In a possible implementation, in a case where the configuration information indicates that the reporting mode is the aperiodic reporting, the receiving module 11 is further configured to:
  receive first indication information from the network device, where the first indication information is configured to indicate whether to transmit the TA information.

In a possible implementation, in a case where the configuration information indicates that the physical channel carrying the TA information is the PUSCH, the first indication information is carried through a physical downlink control channel PDCCH, and the PDCCH is configured to schedule a PUSCH resource, and the first indication information is configured to indicate whether to transmit the TA information on the scheduled PUSCH resource.

In a possible implementation, in a case where the configuration information indicates that the reporting mode is the semi-persistent reporting, the receiving module 11 is further configured to:
  receive second indication information from the network device, where the second indication information is configured to instruct the reporting of the TA information to be started or stopped.

In a possible implementation, the second indication information is carried through a medium access control MAC control element CE, or is carried through a PDCCH.

In a possible implementation, in a case where the configuration information indicates that the physical channel carrying the TA information is the PUCCH, the configuration information includes at least one of the following information:
  time information, configured to indicate a time point at which the TA information is periodically reported each time; and
  resource information, configured to indicate a PUCCH resource used for reporting the TA information.

In a possible implementation, the time information includes at least one of the following information:
  period information, configured to indicate a reporting period for reporting the TA information; and
  offset information, configured to indicate a slot offset within each period.

In a possible implementation, the configuration information further includes: at least one bandwidth part BWP configured for the terminal device, and PUCCH resources corresponding to each BWP.

The resource information is configured to indicate a PUCCH resource of each BWP that is used for reporting the TA information.

In a possible implementation, the configuration information is radio resource control RRC signaling.

In a possible implementation, the TA information includes an index corresponding to the TA value.

In a possible implementation, the TA information includes: an index corresponding to a first TA value or an index corresponding to a second TA value, where the first TA value is a real-time TA value determined by the terminal device, and the second TA value is a change of the real-time TA value determined by the terminal device relative to a last reported TA value.

Figure 13:
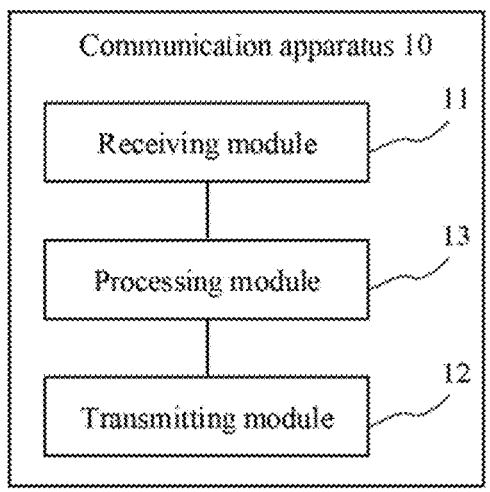
FIG. 13 is a schematic structural diagram of another communication apparatus provided by an embodiment of the present disclosure.

FIG. 13 is a schematic structural diagram of another communication apparatus provided by an embodiment of the present disclosure. On the basis of the embodiment shown in FIG. 12, referring to FIG. 13, the communication apparatus 10 further includes a processing module 13.

The processing module 13 is configured to determine the TA information according to location information of the terminal device and location information of the network device.

In a possible implementation, the processing module 13 is further configured to: determine the location information of the network device, according to ephemeris information.

The communication apparatus provided by the embodiments of the present disclosure may implement the technical solutions described in the foregoing method embodiments, and the implementation principles and beneficial effects thereof are similar to those in the method embodiments, which will not be repeated here.

Figure 14:
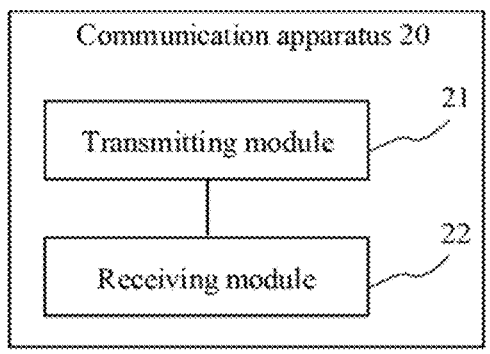
FIG. 14 is a schematic structural diagram of a further communication apparatus provided by an embodiment of the present disclosure.

FIG. 14 is a schematic structural diagram of a further communication apparatus provided by an embodiment of the present disclosure. The communication apparatus 20 may be provided in a network device. Referring to FIG. 14, the communication apparatus 20 includes a transmitting module 21 and a receiving module 22.

The transmitting module is configured to transmit configuration information to a terminal device.

The receiving module is configured to receive timing advance TA information from the terminal device, where the TA information is configured to indicate a TA value determined by the terminal device.

In a possible implementation, the configuration information is configured to indicate at least one of the following information:
  a reporting mode of the TA information, the reporting mode including any one of periodic reporting, aperiodic reporting, and semi-persistent reporting; and
  a physical channel carrying the TA information, the physical channel being a physical uplink shared channel PUSCH or a physical uplink control channel PUCCH.

In a possible implementation, the configuration information is used to indicate any one of the following cases:
  the reporting mode is the periodic reporting, and the physical channel carrying the TA information is the PUCCH; or
  the reporting mode is the aperiodic reporting, and the physical channel carrying the TA information is the PUSCH; or
  the reporting mode is the semi-persistent reporting, and the physical channel carrying the TA information is the PUCCH; or
  the reporting mode is the semi-persistent reporting, and the physical channel carrying the TA information is the PUSCH.

In a possible implementation, the configuration information indicates that the reporting mode is the aperiodic reporting, and the transmitting module 21 is further configured to:
  transmit first indication information to the terminal device, where the first indication information is configured to indicate whether to transmit the TA information.

In a possible implementation, the configuration information indicates that the physical channel carrying the TA information is the PUSCH, the first indication information is carried by a physical downlink control channel PDCCH, the PDCCH is configured to schedule a target PUSCH resource, and the first indication information is configured to indicate whether to transmit the TA information on the target PUSCH resource.

In a possible implementation, the configuration information indicates that the reporting mode is the semi-persistent reporting, and the transmitting module 21 is further configured to:
  transmit second indication information to the terminal device, where the second indication information is configured to instruct the reporting of the TA information to be started or stopped.

In a possible implementation, the second indication information is carried through a medium access control MAC control element CE, or is carried through a PDCCH.

In a possible implementation, the configuration information indicates that the physical channel carrying the TA information is the PUCCH, and the configuration information includes at least one of the following information:

time information, configured to indicate a time point at which the TA information is periodically reported each time; and
resource information, configured to indicate a PUCCH resource used for reporting the TA information.

In a possible implementation, the time information includes at least one of the following information:
  period information, configured to indicate a reporting period for reporting the TA information; and
  offset information, configured to indicate a slot offset within each period.

In a possible implementation, the configuration information further includes: at least one bandwidth part BWP configured for the terminal device, and PUCCH resources corresponding to each BWP.

The resource information is configured to indicate a PUCCH resource of each BWP that is used for reporting the TA information.

In a possible implementation, the configuration information is radio resource control RRC signaling.

In a possible implementation, the TA information includes an index corresponding to the TA value.

In a possible implementation, the TA information includes: an index corresponding to a first TA value, or an index corresponding to a second TA value;

The first TA value is a real-time TA value determined by the terminal device, and the second TA value is a change of the real-time TA value determined by the terminal device relative to a last reported TA value.

Figure 15:
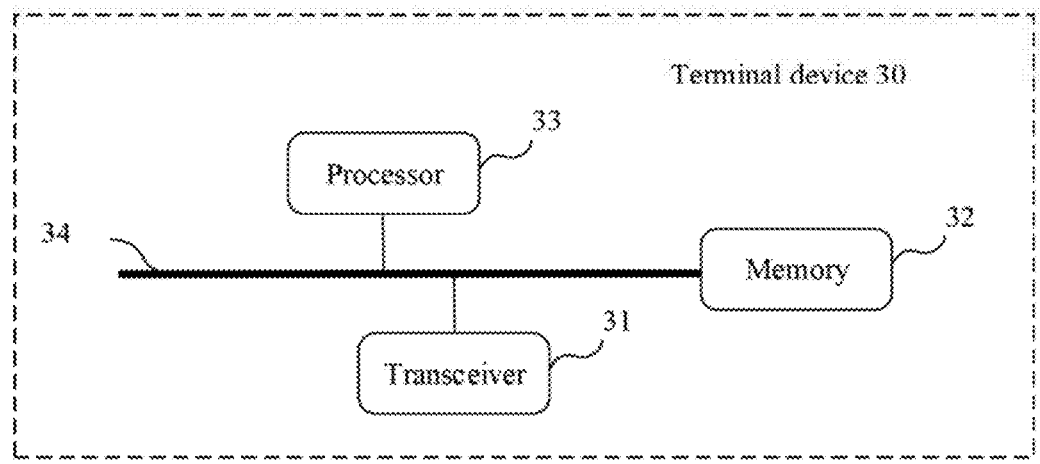
FIG. 15 is a schematic structural diagram of a terminal device provided by an embodiment of the present disclosure.

FIG. 15 is a schematic structural diagram of a terminal device provided by an embodiment of the present disclosure. Referring to FIG. 15, the terminal device 30 may include: a transceiver 31, a memory 32, and a processor 33. The transceiver 31 may include a transmitter and/or a receiver. The transmitter may also be referred to as a sender, an emitter, a transmit port, a transmit interface, etc., and the receiver may be referred to as a receptor, a receiving component, a receive port, a receive interface, etc. Exemplarily, the transceiver 31, the memory 32, and the processor 33 are connected to each other via a bus 34.

The memory 32 is configured to store program instructions.

The processor 33 is configured to execute the program instructions stored in the memory, to cause the terminal device 30 to execute any one of the above communication methods.

The receiver of the transceiver 31 may be configured to implement the receiving function of the terminal device in the above communication method. The transmitter of the transceiver 31 may be configured to implement the transmitting function of the terminal device in the above communication method.

Figure 16:
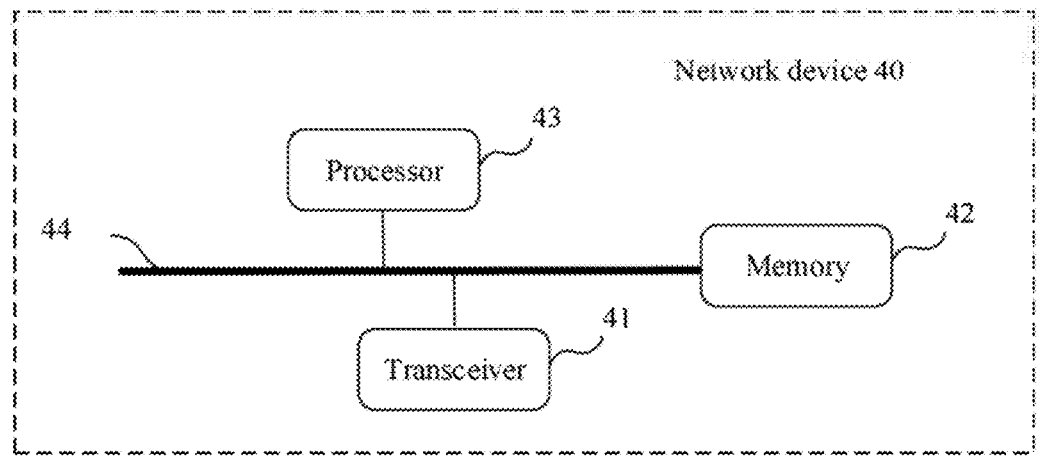
FIG. 16 is a schematic structural diagram of a network device provided by an embodiment of the present disclosure.

FIG. 16 is a schematic structural diagram of a network device provided by an embodiment of the present disclosure. Referring to FIG. 16, the network device 40 may include: a transceiver 41, a memory 42, and a processor 43. The transceiver 41 may include a transmitter and/or a receiver. The transmitter may also be referred to as a sender, an emitter, a transmit port, a transmit interface, etc., and the receiver may be referred to as a receptor, a receiving component, a receive port, a receive interface, or the like. Exemplarily, the transceiver 41, the memory 42, and the processor 43 are connected to each other via a bus 44.

The memory 42 is configured to store program instructions.

The processor 43 is configured to execute the program instructions stored in the memory, to cause the network device 40 to execute any one of the above communication methods.

The transmitter of the transceiver 41 may be configured to perform the transmitting function of the network device in the above communication method.

The embodiments of the present disclosure provide a non-transitory computer-readable storage medium, where computer-executable instructions are stored in the computer-readable storage medium. The computer-executable instructions, when being executed by a processor, cause the above communication method to be implemented.

The embodiments of the present disclosure may further provide a non-transitory computer program product, which may be executed by a processor. The computer program product, when being executed, may cause any of the above communication methods performed by the terminal device to be implemented.

The embodiments of the present disclosure may further provide a computer program product, which may be executed by a processor. The computer program product, when being executed, may cause any of the above communication methods performed by the network device to be implemented.

The terminal device, the computer-readable storage medium, and the computer program product of the embodiments of the present disclosure may execute the communication methods performed by a terminal device, and the specific implementation process and beneficial effects thereof may be referred to the foregoing, which will not be repeated here.

The network device, the computer-readable storage medium, and the computer program product of the embodiments of the present disclosure may execute the communication methods performed by a network device, and the specific implementation process and beneficial effects thereof may be referred to the foregoing, which will not be repeated here.

All or part of the steps of the above method embodiments may be implemented by hardware related to program instructions. The aforementioned program may be stored in a readable memory. When the program is executed, steps including the above method embodiments are executed. The aforementioned memory (storage medium) includes: read-only memory (ROM), RAM, flash memory, hard disk, solid state drive, magnetic tape, floppy disk, optical disc and any combination thereof.

The embodiments of the present disclosure are described with reference to flowcharts and/or block diagrams of methods, devices (systems), and computer program products provided by the embodiments of the present disclosure. It will be understood that, each process and/or block in the flowcharts and/or block diagrams, and combinations of processes and/or blocks in the flowcharts and/or block diagrams, may be implemented by computer program instructions. These computer program instructions may be provided to a processing unit of a general purpose computer, a special purpose computer, an embedded processor or other programmable data processing device to produce a machine, such that the instructions executed by the processing unit of the computer or other programmable data processing device produce means for implementing the functions specified in one or more processes of the flowcharts and/or one or more blocks of the block diagrams.

These computer program instructions may also be stored in a computer-readable memory capable of directing the computer or other programmable data processing device to function in a particular manner, such that the instructions stored in the computer-readable memory produce an article of manufacture including instruction means, these instruction means implement the functions specified in one or more processes of the flowcharts and/or one or more blocks of the block diagrams.

These computer program instructions may also be loaded onto the computer or other programmable data processing device to cause a series of operational steps to be executed on the computer or other programmable device, to produce a computer-implemented process, such that the instructions executed on the computer or other programmable device provide steps for implementing the functions specified in one or more processes of the flowcharts and/or one or more blocks of the block diagrams.

Apparently, those skilled in the art may make various modifications and variants to the embodiments of the present disclosure without departing from the spirit and scope of the present disclosure. Thus, if these modifications and variations of the embodiments of the present disclosure fall within the scope of the claims of the present disclosure and their equivalents, they are also intended to be covered by the present disclosure.

In the present disclosure, the term "comprise" and its variants may mean non-limiting inclusion; the term "or" and its variants may mean "and/or". The terms "first", "second" and the like in the present disclosure are used to distinguish similar objects, and are not necessarily used to describe a specific order or sequence. In the present disclosure, "multiple" means two or more. The phase "and/or", which describes an association relationship of associated objects, means that there may be three kinds of relationships; for example, A and/or B may mean three cases: A exists alone; A and B exist at the same time; and B exists alone. The character "/" generally indicates that the associated objects are in an "or" relationship.

What is claimed is:

1. A communication method for a non-terrestrial network (NTN), implemented by a terminal device, the method comprising:
   receiving configuration information from a network device; and
   transmitting timing advance (TA) information to the network device, according to the configuration information, wherein the TA information is configured to indicate a TA value determined by the terminal device;
   wherein the configuration information is configured to indicate;
   a reporting mode of the TA information; and
   a physical channel carrying the TA information;
   wherein the reporting mode is aperiodic reporting, and the physical channel carrying the TA information is a physical uplink shared channel (PUSCH).

2. The method according to claim 1, wherein before the transmitting TA information to the network device according to the configuration information, the method further comprises:
   receiving first indication information from the network device, wherein the first indication information is configured to indicate whether to transmit the TA information.

3. The method according to claim 2, wherein the first indication information is carried through a physical downlink control channel (PDCCH), the PDCCH is configured to schedule a PUSCH resource, and the first indication information is configured to indicate whether to transmit the TA information on the scheduled PUSCH resource.

4. The method according to claim 1, wherein the configuration information is radio resource control (RRC) signaling.

5. The method according to claim 1, wherein the TA information comprises an index corresponding to the TA value.

6. The method according to claim 1, wherein the TA information comprises: an index corresponding to a first TA value or an index corresponding to a second TA value;
wherein the first TA value is a real-time TA value determined by the terminal device, and the second TA value is a change of the real-time TA value determined by the terminal device relative to a last reported TA value.

7. The method according to claim 1, wherein before the transmitting TA information to the network device according to the configuration information, the method further comprises:
determining the TA information, according to location information of the terminal device and location information of the network device.

8. The method according to claim 7, wherein before the determining the TA information according to location information of the terminal device and location information of the network device, the method further comprises:
determining the location information of the network device according to ephemeris information.

9. A communication method for a non-terrestrial network (NTN), implemented by a network device, the method comprising:
transmitting configuration information to a terminal device; and
receiving timing advance (TA) information from the terminal device, wherein the TA information is configured to indicate a TA value determined by the terminal device;
wherein the configuration information is configured to indicate:
a reporting mode of the TA information; and
a physical channel carrying the TA information;
wherein the reporting mode is aperiodic reporting and the physical channel carrying the TA information is a physical uplink shared channel (PUSCH).

10. The method according to claim 9, wherein before the receiving TA information from the terminal device, the method further comprises:
transmitting first indication information to the terminal device, wherein the first indication information is configured to indicate whether to transmit the TA information.

11. The method according to claim 10, wherein the first indication information is carried through a physical downlink control channel (PDCCH), the PDCCH is configured to schedule a PUSCH resource, and the first indication information is configured to indicate whether to transmit the TA information on the scheduled PUSCH resource.

12. A terminal device, comprising a transceiver, a processor, and a memory;
wherein the memory is configured to store computer-executable instructions; and
the processor is configured to execute the computer-executable instructions stored in the memory, to cause the processor to:
receive, through the transceiver, configuration information from a network device;
determine a timing advance (TA) value, in response to the configuration information; and
transmit, through the transceiver, TA information indicating the TA value to the network device;
wherein the configuration information is configured to indicate;
a reporting mode of the TA information; and
a physical channel carrying the TA information;
wherein the reporting mode is periodic reporting, and the physical channel carrying the TA information is a physical uplink shared channel (PUSCH).

* * * * *